United States Patent [19]

Gabb et al.

[11] Patent Number: 5,443,622
[45] Date of Patent: Aug. 22, 1995

[54] HYDROMETALLURGICAL PROCESSING OF IMPURITY STREAMS GENERATED DURING THE PYROMETALLURGY OF COPPER

[75] Inventors: Philip J. Gabb, Salt Lake City; Kenton E. Sutliff, Holliday; Barry A. Wells, Centerville, all of Utah; J. Philip Evans, Georgetown, Canada

[73] Assignee: Kennecott Corporation, Salt Lake City, Utah

[21] Appl. No.: 202,819

[22] Filed: Feb. 28, 1994

[51] Int. Cl.$^6$ ............................................. C22B 3/08
[52] U.S. Cl. ................................... 75/743; 423/554; 423/109; 210/711
[58] Field of Search ........................ 75/743, 718, 726; 210/711, 713; 423/367

[56] References Cited

U.S. PATENT DOCUMENTS

| | | | |
|---|---|---|---|
| 3,218,161 | 11/1965 | Kunda et al. | 75/108 |
| 3,575,853 | 4/1971 | Gaughan et al. | 210/46 |
| 3,617,559 | 11/1971 | Cywin | 210/46 |
| 3,728,430 | 4/1973 | Clitheroe | 423/26 |
| 3,747,764 | 7/1973 | Graham et al. | 23/10 |
| 4,186,088 | 1/1980 | Fitch et al. | 210/45 |
| 4,465,597 | 8/1984 | Herman et al. | 210/713 |
| 4,543,189 | 9/1985 | Rice et al. | 210/713 |
| 4,566,975 | 1/1986 | Torkel | 210/711 |
| 4,572,822 | 2/1986 | Abe et al. | 423/37 |
| 4,606,829 | 8/1986 | Rice et al. | 210/173 |
| 4,728,438 | 3/1988 | Featherstone et al. | 210/173 |
| 4,891,067 | 1/1990 | Rappas et al. | 75/101 R |
| 5,032,175 | 7/1991 | Raborar et al. | 75/416 |
| 5,039,428 | 8/1994 | Wentzler et al. | 210/711 |

FOREIGN PATENT DOCUMENTS 1020363 11/1977 Canada.
2216114 10/1989 United Kingdom.

OTHER PUBLICATIONS

"Alternative Processing of Copper Smelter Flue Dust for Bismuth Control", D. K. Steele and K. S. Gritton, presented at the 1st Separation Division Topical Conference on Separations Technologies—New Developments and Opportunities; Miami Beach, Fla., Nov., 1992, pp. 1-8.

"The Advantage of a Crowd for Acid Waste Liquors", J. H. Smith III, Dec., 1992, pp. 87-89.

Primary Examiner—Peter D. Rosenberg
Attorney, Agent, or Firm—Whyte Hirschboeck Dudek

[57] ABSTRACT

Impurity streams generated during the pyrometallurgy of copper are hydrometallurgically processed at ambient pressure for recovery of primary values in an energy-efficient manner and with the capture and conversion of metallic impurities to states that are acceptable for disposal into the environment. Hallmark features of the various embodiments of this invention include the water leach of flue dust, the extraction of water-soluble copper as a separate product, a controlled acid leach stage in which bismuth is solubilized, the return of copper to the smelting process as a sulfide, the ability to operate the various process stages at essentially ambient pressure, and the gradual reduction in temperature over the course of the process without the use of indirect heating or cooling operations.

33 Claims, 1 Drawing Sheet

HYDROMETALLURGICAL PROCESSING OF IMPURITY STREAMS GENERATED DURING THE PYROMETALLURGY OF COPPER

FIELD OF THE INVENTION

This invention relates to the pyrometallurgy of copper. In one aspect, the invention relates to the treatment of impurity streams produced during the smelting of copper concentrate and the converting of copper matte, while in another aspect the invention relates to an integrated hydrometallurgical treatment of flue dust, acid plant blowdown (APB) and bleeds from other processes typically associated with the pyrometallurgy of copper, e.g., copper and precious metal refining. In yet another aspect, the invention relates to a streamlined hydrometallurgical process that captures and returns for further processing many impurity stream components, some of which are further processed to desirable end products while others of which are rejected in a form suitable for environmentally acceptable disposal.

BACKGROUND

The modern demands to produce base metals in a profitable yet environmentally safe manner has caused many producers to re-examine their overall processing technology. Copper producers, like all other base metal producers, have long practiced technology that was effective for converting ore to finished products, but this technology must now meet ever-increasingly stringent environmental regulations. To meet these demands, copper producers can either retrofit their existing technology or introduce new copper pyrometallurgy. In either or both cases, the fundamental problem of controlling the destinations of impurities remains.

The pyrometallurgy of copper is a multi-step process, and impurity streams in their various forms are generated at each step. As here used, "impurity" means any component of the starting material that affects the ability to produce pure products and safe disposal streams. In the pyrometallurgy of copper, desired end products other than copper include the valuable metals generally found with copper in the copper ore, e.g., gold, silver, molybdenum, selenium and nickel. Depending upon the copper deposit, other desirable metals may also be present. Typical impurities, other than nonmetallic components such as the silicates and various other gangue components, include antimony, bismuth, arsenic, zinc, cadmium, mercury, iron, tellurium, and the like. While these metal values may be the subject of capture and eventual sale depending upon their concentration in the ore and the form in which they are present in the ore, these metals are typically the subject of capture for ultimate nonsale disposal.

The pyrometallurgy of copper begins with the smelting of copper concentrate to copper matte. This process generates impurities streams in the form of flue dust and APB (i.e. wet gas scrubbing liquids otherwise known as "acid plant blowdown"). During smelting, a process gas stream is produced into which various impurities are volatilized along with dust, the latter being the result of incomplete smelting of concentrate particles and which includes desirable end products. The impurities must eventually be separated from the desirable end products, and eventually eliminated from the pyrometallurgical circuit.

In addition, the smelting process generates gaseous products which have both heat and sulfur values. These gases are first transferred to a cooler, which may be a waste heat boiler for capture of the latent heat value, or to a water quench system if heat recovery is not required. Cooling of the gas by either of these methods results in the removal of dust that is mostly in the form of unsmelted particles. This material contains relatively small proportions of impurities and is generally recycled to the concentrate smelting process.

After cooling of the gas, a further stage of dry gas cleaning (e.g. a bag house, an electrostatic precipitator, etc.) is normally adopted to remove remaining unsmelted particles and species condensed from volatilized impurities. The impurity content of the product of this cleaning is much higher than the previously cooled material which, in the case of a copper concentrate with a low impurity content, can be returned to the concentrate smelting stage without major impact on the impurity content of the pyrometallurgical products. In the case of a copper concentrate with a high impurity content, this material must be processed separately from the concentrate smelting stage to avoid unduly raising the impurity content in the pyrometallurgical products.

After dry cleaning the gas, it still contains a minor quantity of unsmelted particulate and volatile impurities, the nature and quantity of volatile impurities dependent on the temperature at which the gas was cooled. This gas also contains sulfur dioxide and sulfur trioxide values from the concentrate smelting process, which at certain locations around the world, is presently released to the atmosphere through a stack. However, in an increasingly environmentally conscious world, this practice is becoming less acceptable. Consequently, the sulfur dioxide and trioxide are now routinely the object of capture, and this is commonly accomplished in an acid plant. However before this gas can be used as a feed to an acid plant, it must be further cleaned in a wet scrubbing operation to remove the last traces of unsmelted particulate and volatile impurities.

During this wet scrubbing operation, sulfur trioxide is captured and forms a dilute sulfuric acid solution. At the same time the particulates are captured in solid form as a dilute slurry, and the volatile impurities are condensed to form either a solid material in the dilute slurry or dissolve in the dilute sulfuric acid. This dilute slurry must be removed from the scrubbing system as a bleed stream, and this is known as APB.

The copper matte produced by the smelting process is an intermediate which is then converted to blister copper in a conversion process. This process also generates a process gas containing unconverted particles and volatilized impurities both of which are treated in a manner similar to the concentrate smelting process gas.

In addition to the impurity streams generated in the smelter and converter, impurity streams are also generated in the fire refining of blister copper to anode copper in the anode furnaces, and in the associated processes of electrorefining of the anode copper and precious metal refining. The impurity streams from the electrorefining of copper and from the refining of precious metals can be variously liquids, solids and slimes.

Due to the presence of desirable end products, e.g., principally copper, gold and silver, and the desire to minimize the ultimate amount of material that must be removed from the pyrometallurgical process for nonsale disposal, these impurity streams are recycled to the fullest extent possible. However, recycle, if not carefully controlled, will inevitably result in increasing the amount of impurities in the intermediate and final products to a point at which the products are unacceptable. Different impurities have different impacts on the pyrometallurgical process and the properties of its end products.

For example, bismuth is known to be an embrittling agent in copper cathode (the desired copper end product) and although its general specification calls for less than 1 ppm, its use for wire drawing demands levels as low as 0.25 ppm. Unfortunately, bismuth has a great affinity for the copper phases of copper smelting and as such, a relatively small amount in the process, be it from the original copper concentrates or recycled impurity streams, can have a relatively large affect on copper cathode quality. Similarly, tellurium and selenium are also embrittling agents but since neither are very soluble in copper electrolyte, neither transfer to the copper cathode in any appreciable amount.

Antimony is similar in its behavior and concentrations in the overall process to that of bismuth although it impacts the quality of copper cathode differently. Whether antimony reaches the maximum level in cathode copper before bismuth does so is dependent upon the relative proportions of these elements in copper concentrate, and also upon their deportments in the particular copper smelting technology in use.

Although the target amount of lead in cathode copper is also relatively small, e.g. less than 5 ppm, the amount of lead in the overall process can be, and often is, orders of magnitude larger than that of bismuth and antimony. However unlike bismuth and antimony, a certain level of lead in anode copper (the penultimate copper end product) is beneficial to the production of copper cathode because lead contributes to the rejection of bismuth and antimony into the anode slimes (and thus obstructs their dissolution into copper electrolyte and their consequent deposition into the cathode copper).

Arsenic can have levels in the concentrates and the process intermediate products similar to lead, and it too has a beneficial level in anode copper. General refining practice is to require levels of arsenic equal to or greater than three times the combined molar composition of bismuth and antimony in the anode copper. This is believed to promote, in conjunction with the presence of lead, the deposition of bismuth and antimony into anode slimes. In some cases, smelters may add purchased arsenic in various forms to the smelting process to optimize the arsenic level in anode copper. Moreover, certain levels of arsenic in copper electrolyte also have a promotional effect in deporting bismuth and antimony to anode slimes, and thus inhibiting their dissolution in the electrolyte and possible ultimate deposition into the copper cathode.

Cadmium is an impurity that is found in close association with zinc but at much lower concentrations. While zinc deports in large measure to the smelter slag, cadmium preferentially volatilizes into the process gas and deports to dry dust and APB. While cadmium does not finally deport to the copper cathode, if repeatedly recycled to the smelter, it will build in concentration to a point that it becomes a health and environmental issue.

Like cadmium, mercury forms volatile species that report to the gas stream and in this case, almost exclusively to APB. If allowed to build in concentration in the gas stream, then it can have an adverse impact on the quality of the sulfuric acid produced by the plant.

The traditional methods of controlling these and other impurities have been the separate or partially integrated processing of the APB, the smelting and converting dusts, and the copper and precious metal refining bleeds. In some cases, these impurity streams are processed to remove at least a portion of the impurities present in the stream before the stream is recycled back to the pyrometallurgical circuit. In other cases, a portion of the impurity stream itself is simply removed from the circuit, e.g. flue dust can be collected and sold to various processors as a feed material for their operations, e.g., lead-zinc smelting facilities. However, due to the presence of valuable primary product in these impurity streams, such practices are often economically undesirable and in some remote locations, simply not available.

Over the years, copper processors have developed and operated various hydrometallurgical processes for treating flue dust for capture of its valuable components and for the ultimate removal of its undesirable components from the pyrometallurgical circuit. These hydrometallurgical processes have taken various forms, but usually involve the acid leaching of the dust to solubilize the metal components, and then the sequential precipitation of these various components. If possible, precipitated material, e.g., copper sulfide or hydroxide, is recycled to the smelter, and where not possible or practical, precipitated material, e.g., ferric arsenate or arsenic sulfide, is rendered environmentally acceptable and disposed, e.g., to a tailings pond or a managed hazardous materials facility. While most of these processes have proven effective in one manner or another, all are subject to improvement, particularly with respect to increased capture of desirable end products, energy reduction, and the reduction of materials ultimately discharged to the environment.

SUMMARY OF THE INVENTION

According to this invention, impurity streams generated during the pyrometallurgy of copper are hydrometallurgically processed at ambient pressure for recovery of primary metal values in an energy-efficient manner and with the capture and conversion of impurities, particularly metallic impurities, to states that are acceptable for disposal to the environment. The improved hydrometallurgical process of this invention also produces environmentally acceptable effluent streams. In addition, the process can accept impurity streams from copper electrorefining and precious metal refining operations, and it can accept impurity streams in solid, liquid and slurry form. In short, the process of this invention enables the recovery of valuable products with the rejection of hazardous impurities to tailings ponds, managed hazardous materials facilities, and the like, and the rejection of nonhazardous impurities to the environment in an acceptable and benign form.

Generally, the process comprises receiving and subjecting impurity containing dust from smelter sources to a water leach in which the dust is "pulped", and solubilizing the water-soluble copper component in the dust. The pulp is then subjected to a liquid/solid separation in which the solid is transferred to an acid leach stage and the liquid either recycled, or forwarded to a copper precipitation stage, or bled from the system for alternative processing, or some combination of these steps. If the dust enters the process of this invention in slurry form, the water leach step can be omitted.

In the acid leach stage, the solid fraction of the pulp is mixed with sulfuric acid, steam, process water, and in some embodiments, APB, acid plant mist eliminator bleeds, refinery bleeds, and recycled liquids from downstream processing steps. This leach stage solubilizes various metallic components, both copper and deleterious species such as bismuth, antimony, arsenic, etc., and then the acid leach slurry is subjected to a solid/liquid separation. The solid fraction containing lead and precious metals is transferred to a downstream copper precipitation stage, while the liquid fraction is forwarded for bismuth precipitation. The transfer of the solid fraction to the copper precipitation stage avoids the customary practice of removing this material from the hydrometallurgical system by conveying it to a lead smelter for further processing with the concomitant transportation difficulties and costs and possible loss of precious metal values.

At the bismuth precipitation stage, the liquid fraction from the acid leach is mixed with bleed streams from one or both of the copper electrorefining facility and precious metal refining facility, together with a reagent to provide chemical reduction of the liquid fraction, e.g., sodium bisulfite, and a reagent to provide a neutralizing action, e.g., a limestone slurry. Bismuth is precipitated, and the washed precipitate either removed and transferred to a downstream iron precipitation/final neutralization stage, or simply removed from the circuit without further processing. The liquid fraction is forwarded to a copper precipitation stage in which it is admixed optionally with the solid fraction of the acid leach stage. In the same stage, a sulfidizing agent, such as gaseous hydrogen sulfide ($H_2S$) or liquid sodium hydrogen sulfide (NaHS) is added to precipitate copper as copper sulfide (CuS) and, optionally, arsenic as arsenic sulfide ($As_2S_3$). Other species will be extracted as sulfides to a minor extent in this same stage, e.g. molybdenum, zinc, etc. In some embodiments, APB and/or a portion of the liquid fraction of the water leach can also be added.

Copper together with a proportion of arsenic and other species as precipitated sulfides are separated, washed and returned to the smelter. The liquid fraction is either forwarded to the iron precipitation stage or transferred to arsenic/cadmium precipitation.

The liquid fraction from the copper precipitation is admixed with $H_2S$ or NaSH and, optionally, with APB, the resulting arsenic and cadmium precipitate separated from the liquid fraction and removed from the system for environmentally safe disposal, and the liquid fraction forwarded to the final precipitation stage.

In alternative embodiments, the arsenic/cadmium precipitation stage can be operated in the absence of the liquid fraction of the copper precipitation stage, i.e. simply with APB and either $H_2S$ or NaSH. In this mode, the liquid fraction can be returned to the acid leach stage to reduce the requirement for fresh acid. In the case in which the bismuth precipitate is transferred to the final neutralization stage, it can be repulped with the liquid fraction from the copper or arsenic/cadmium precipitation stage.

The possible feeds to the final precipitation stage include the liquid fraction of the copper precipitation stage or the liquid fraction of the arsenic/cadmium precipitation stage (either or both optionally admixed with the bismuth precipitate), oxygen, limestone slurry, and milk of lime (calcium hydroxide in water). The resulting iron precipitates together with any other neutralization precipitates, e.g. gypsum, are suitable for environmentally safe discharge. The resulting liquid is also suitable for environmentally safe discharge or, optionally, with removal of dissolved salts, it can be recycled to the smelter water circuit.

Hallmark features of the various embodiments of this hydrometallurgical process include the water leach of flue dust, extraction of water-soluble copper as a separate product, the controlled acid leach stage, the retention of the acid leach solid fraction in the process for ultimate recovery of the copper and precious metal values, the rejection of bismuth by controlled neutralization of the acid leach liquid fraction, the return of copper to the smelting process as a sulfide, the gradual reduction in temperature over the course of the process without the use of indirect heating or cooling operations, the ability to operate the various process stages at essentially ambient pressure, and the control of the proportion of arsenic returned to the smelting process.

DETAILED DESCRIPTION OF THE INVENTION

Figure 1:
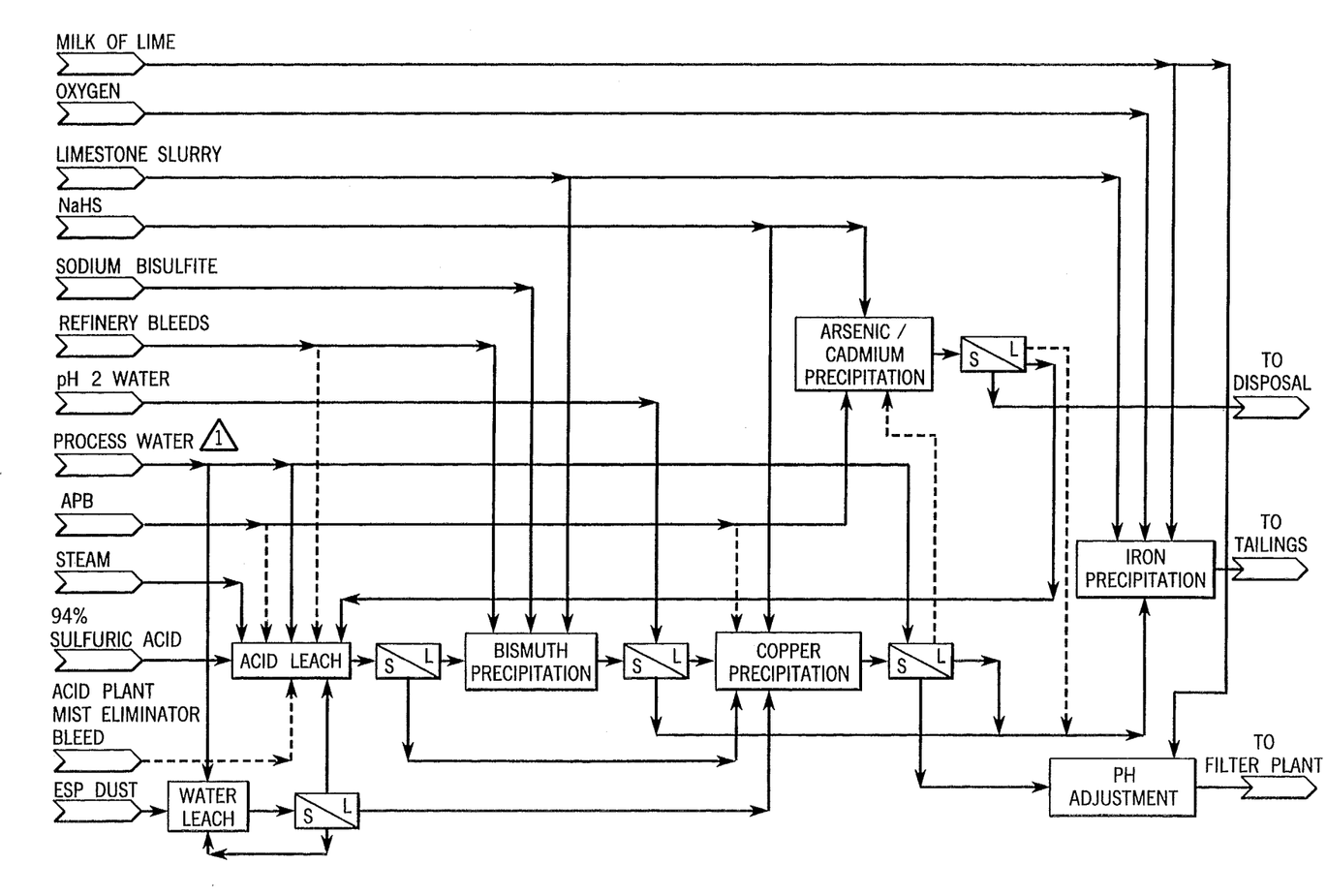
The Figure is a flow diagram illustrating various process embodiments of this invention.

In the Figure, flue dust from any source and generally collected through electrostatic precipitation or from bag houses is pulped with process water and, optionally, recirculated leach solution, typically with an acid pH between 2 and 4. The pulping can occur remote from the hydrometallurgical facility, e.g. at the smelter or converter, or at the hydrometallurgical facility. Generally, remote pulping is preferred because it avoids transporting dust about the smelter and the hydrometallurgical facility.

Pulping has the distinct advantage of solubilizing most, if not all, of the water-soluble copper, e.g. copper sulfate ($CuSO_4$), present in the dust. The other metal values in the dust, e.g. bismuth, arsenic, cadmium, zinc, iron, antimony, molybdenum, selenium, tellurium, and the like, may or may not solubilize depending upon the form in which they are present. For example, cadmium is usually present in a highly water-soluble form and as such, most of it is also solubilized. Zinc, on the other hand, is usually present in a less water-soluble form and as such, solubilizes to a less extent than either copper or cadmium. Arsenic and many of the other metals present in the dust are present in a nonsoluble form, relative to copper and cadmium, and as such do not solubilize to any great extent. The nonsoluble metals, of course, remain in the leached particles. The acidity of the pulp mass is a function of the flue dust since the pH of the process water is for all intent and purposes neutral.

Solubilizing copper at this early stage in the process provides a number of advantages over existing hydrometallurgical processes for processing flue dust. One advantage of solubilizing a large portion of copper at this early stage is that it reduces the need to remove cooper in downstream stages with expensive consumable reagents such as NaSH. Another advantage of solubilizing a large portion of copper at this early stage is that it allows the reduction in the size of the acid leach and bismuth precipitation stages, which in turn reduces the plant capital and operating costs.

Yet another advantage of solubilizing copper at this early stage is that it introduces flexibility with respect to the processing of the various products produced by the process. Specifically, the liquid fraction of the water leach pulp can be processed in one or more of a number of different manners, e.g. transferred to the copper precipitation stage, or discharged from the process for separate treatment, e.g. crystallization to produce copper sulfate, solvent extraction/electrowinning (SX/EW) to recover elemental copper, chemical precipitation to produce copper as copper hydroxide/oxide/carbonate or as a copper sulfide, any of which can be recycled to the smelter, and the like.

The controlling factor in the operation of the water leach stage is the concentration of copper sulfate in the circulating liquid (i.e. the liquid fraction of the water leach pulp). For a given dust, choosing a copper concentration will define the pulp density or solids content of the water leach pulp and the temperature of the circulating liquids. For example in a preferred embodiment, the copper concentration is about 35 g/l with a temperature of about 45° C. and a pulp density of about 5 weight percent solids. However, it may be desirable to increase the copper level or concentration in the circulating liquid, e.g. for crystallization purposes, to 100 g/l or more. At this new level, the pulp density is increased to about 15% solids. To achieve a suitable temperature to maintain copper solubility, supplemental heat may be required, e.g. by steam injection. Heat is otherwise supplied to the circulating liquid by the heat of solution of the anhydrous copper sulfate in the dust. As a practical matter, the maximum pulp density of the water leach stage is about 25% solids. Typically, the flue dust is pulped for a sufficient period of time, e.g., less than an hour, with good agitation to solubilize virtually all of the water-soluble copper in the dust.

After the flue dust is sufficiently pulped and the solubilization of water-soluble copper optimized, the water leach pulp is subjected to a solid/liquid separation by any conventional means, e.g. thickening, filtering, centrifugation, etc. As noted above, the liquid fraction can be further processed in one or more different manners but preferably, the liquid fraction is divided into a first stream which is returned to the water pulping stage, and a second stream which is forwarded for further processing, e.g. to the copper precipitation stage.

The sizes of these streams are a function of a number of variables not the least of which is the concentration of water-soluble copper. The size of the stream forwarded for further processing is relatively small as compared to the size of the stream recycled to the water leach stage. The actual size of this stream is adjusted to maintain a desired copper concentration in the recycle stream, e.g. if the copper concentration exceeds the desired level, then the size of the stream forwarded for further processing is increased and make-up process water will be added to the recycle stream.

The solids fraction of the water leach pulp is transferred to the acid leach stage for admixture with sulfuric acid (typically 94% strength), steam, additional process water, and optionally APB, refinery bleeds, and a liquid fraction from the arsenic/cadmium precipitation stage. Here, a majority of the deleterious impurities such as arsenic, bismuth and antimony are solubilized. The acid leach pulp is strongly acidic at commencement of the leach and reduces in acidity as it passes through the leach stages. Typically, there will be three or more continuous acid leach reactors and the initial acidity will be in the order of 200 g/l and the final acidity will be in the order of 90 g/l. This final acidity is necessary to maintain the solubility of the dust components, especially that of bismuth.

Acid is necessary for the further leaching of the water leach residue, and it can be supplied either by fresh commercial acid or by the acid content of feed streams, e.g. refinery bleeds and APB. One feature of this invention is that the acidity of these feed streams can be usefully employed. APB can be added directly to this stage or its acid content can be recycled from the arsenic/cadmium precipitation stage. Refinery bleeds, especially tank house electrolyte, also contain beneficial amounts of free acid and can be used similarly. The utilization of these acid containing streams reduces the overall amount of neutralization reagents later consumed. To obtain a beneficial contribution, the acid content of the feed streams should be above the final concentration of the acid leach, e.g., typically above 90 g/l sulfuric acid.

If the refinery bleeds are liquids and if they are admixed with the other components of the acid leach stage, they can be introduced either separately or first commingled with one another and then introduced as a blend. As a practical matter, the acidity of the bleed from the copper electrorefining operation is typically much larger than that from a hydrometallurgical precious metal refining operation and as such, the characteristics of the former dominate those of the latter, regardless of whether introduced separately or as a blend.

By the careful operation of this acid leach stage, significant benefits are obtained. Specifically, if the concentration of copper and copper plus iron in the leach solution is maintained within certain desirable limits, these limits a function of the nature of the dust, acidity, temperature, residence time, and like variables, the solubility of bismuth and antimony can be optimized. If the concentration of copper and copper plus iron in the leach solution is allowed to rise above these desirable levels, then the solubility of bismuth and antimony are suppressed. Typically, the temperature at which the acid leach is conducted is between about 60° and about 100° C., preferably between about 75° and about 95° C.

The acid leach stage produces a residue that contains essentially all of the lead, gold and silver present in the acid leach feed. Under normal circumstances, the precious metals content of this residue is such that nonsale disposal is uneconomic. In a preferred embodiment of this invention, this residue is returned to the smelter. Because a large proportion of impurities like bismuth and antimony have been solubilized, the major impurity impact of such recycle is due principally to the lead content. As noted above, a certain amount of lead in anode copper is desirable to control bismuth and antimony during the electrorefining of copper. If the amount of lead recycled in acid leach residue causes the desired level in copper anode to be exceeded, then either some leach residue must be removed from the circuit or additional lead must be removed from the smelting process. In the latter case, lead can be removed from the last fire refining stage to optimize the quantity of lead in copper anode.

After the deleterious metal values have been solubilized, the acid leach pulp is subjected to a liquid/solid separation, again by any conventional means. The liquid fraction is forwarded to the bismuth precipitation stage in which it is admixed with feeds containing bismuth, e.g., refinery bleeds. Such admixed feeds can also be routed to the acid leach stage but, in the case where these feeds have an appreciable concentration of soluble bismuth, they can affect the final extraction of the bismuth from the solid feeds to the acid leach stage, e.g., the dust. Such feeds, i.e., those containing appreciable soluble bismuth are preferably routed to the bismuth stage where they are processed with reducing and neutralizing reagents to preferentially remove the bismuth in solid form.

Bismuth has a tendency to precipitate with, or before, copper under typical sulfidizing conditions, hence separation of these two metals is not readily achieved and if not achieved, then copper returned to the smelter would contain appreciable bismuth contamination. Unfortunately, bismuth is a contaminant to the pyrometallurgy of copper and as such, it must be removed from the process. Some bismuth is rejected in smelter slag along with other impurity metals. However, if smelter dusts are returned to the smelting process, its deportment to slag is generally insufficient to provide an adequate bleed to provide an acceptably low level in smelter anode copper. This principle can also be true for other impurities, such as arsenic and antimony, and it is the reason for removal of dusts from the circuit for separate processing.

If copper is to be removed from the solutions as a sulfide, then a bismuth removal stage must be interposed between the leach and sulfidizing stages. In this invention, bismuth can be removed from the acid solution by careful neutralization of the solutions to produce what is believed to be a solid oxy-salt of bismuth such as bismuth oxysulfate, or bismuth oxychloride, or bismuth oxynitrate. The technical literature claims that these compounds of bismuth are produced by dilution of solutions containing soluble bismuth, but this method requires considerable dilution, as much as 20 times the initial volume, to effect a high degree of bismuth precipitation and would produce an excessively high volume of liquid for further processing.

One of the purposes of this invention is to keep the liquid volumes of the overall hydrometallurgical process to a minimum so as to reduce capital and operating costs, and to minimize the final effluent volume so that mass discharge limitations of impurities in the final liquids are easy to meet. One suitable neutralizing agent to effect the required neutralization is limestone slurry which has the benefits of a natural pH close to the preferred pH of neutralization for removal of bismuth. Limestone is also an inexpensive form of neutralizing power in most locations throughout the world.

Alternative neutralization agents can be employed to effect the preferential precipitation of bismuth, but greater care is required if the natural pH levels of the reagents are higher than that of limestone. Commercially available neutralizing technology exists that assists in the control of both the pH and the precipitated particle size and density, and this technology can be employed to improve process control and product quality. The preferred pH of the bismuth stage for precipitation of bismuth is in the range of about 1.5 to 2.5, preferably between about 2.0 to 2.5, and typically between about 2.2 to 2.3.

However, if the oxidation state of the soluble arsenic in feed solutions is partially, or wholly in the $+5$ valency state rather than the $+3$ valency state, then the removal of bismuth will be accompanied with some removal of arsenic. Removal of arsenic with bismuth is not desirable because the resulting mixture is difficult to dispose of in an environmentally acceptable manner.

The valency state of the feed solutions is complicated by the presence of soluble iron that will have a variable valency between the ferrous and ferric states. However, the introduction of a reducing agent to control the valency state of the feed solutions will inhibit the precipitation of arsenic species between the bismuth precipitation range of about pH 1.5 to about pH 2.5.

A suitable reducing agent that fits well with the process chemistry of the smelter system is sulfur dioxide. This can be obtained in gaseous or liquid forms from the smelter off-gas and introduced into the bismuth removal stage. Alternatively, sulfur dioxide can be provided in the form of sodium bisulfite which is a readily available bulk chemical in industrial areas, or it can be produced on-site from smelter off-gas. The preferred way to introduce the sulfur dioxide containing species is in conjunction with the neutralizing agent so that the acidity of the solution is reduced, and the loss of sulfur dioxide in the gaseous state from the surface of the reactor is minimized. This situation is especially true when the temperature of the bismuth removal system is above ambient, e.g., 80° C.

The amount of reductant necessary to inhibit arsenic precipitation is not the stoichiometric quantity for the reduction of arsenic, iron and other species, but it is a lesser quantity. For example, a quantity of reductant equivalent to the reduction of 50% of the ferric species present and 75% of the arsenic species present is sufficient to inhibit arsenic coprecipitation with the bismuth. The presence of other multiple valency elements, such as molybdenum, may influence the quantity of reductant so the required amount is not limited to these stoichiometric ratios.

The product from the bismuth precipitation stage is dependent upon the nature of the neutralizing agent. In the case where the neutralizing agent is a calcium compound, such as calcium carbonate or calcium hydroxide, the bismuth product will be diluted with calcium sulfate (gypsum) and the resulting solutions will be low in soluble sulfates. In the case where the neutralizing agent is a sodium or magnesium compound, such as sodium carbonate, sodium hydroxide or magnesium hydroxide, the bismuth product will be concentrated and the resulting solutions will be high in soluble sulfates. The decision on the type of neutralizing agent to be used will depend on economic and environmental factors. Low cost operation will favor the use of the most inexpensive locally available reagent, whereas local environmental factors may favor the production of a soluble sulfate effluent in preference to a bulk gypsum product. For example, smelters on a water course, or on the sea coast, would favor the rejection of both a safe liquid effluent containing soluble sulfates and a minimized bismuth-containing material for disposal (or for possible further bismuth extraction). Alternatively, smelters with an inland site, and possibly with an associated mine and tailings dam, would favor the production of a safe, nonhazardous solid waste with a low soluble sulfate liquid effluent. The process as described is able to meet the criteria outlined to provide the optimum application of the technology.

The solid fraction from the acid leach stage contains copper, precious metal, lead and other metal values. In the past, this residue was removed from the circuit, e.g., sold or transferred to a lead smelting facility for recovery of the lead and precious metal values. In the process of this invention, the solid fraction of the acid leach stage is transferred either to the copper precipitation stage, or separately extracted and recycled. The eventual recycle of the lead to the smelter is of little consequence. If the amount of lead in the original concentrate is initially low, then the recycle of lead is good as described above relative to the manufacture of cathode copper. If the amount of lead in the original concentrate is high, then a value still exists in returning the acid leach residue to the smelter because of the precious metal content. The undesirable lead can be removed from the anode refining furnace as a lead silicate slag which can be processed elsewhere, e.g., at a lead smelter. If the lead residue from the acid leach stage is simply discarded, too much precious metal value is potentially lost.

At the copper precipitation stage, the liquid fraction from the bismuth production state is optionally admixed with the acid leach residue, and optionally admixed with a portion of the liquid fraction from the water leach stage and with a sulfidizing reagent. In addition, APB can be added directly to this stage both as a means to increase the recycle of arsenic to the process during periods when the anode composition is low in arsenic, and also to control the acidity of the sulfide precipitation liquids for selective sulfide precipitation.

The sulfidizing reagent is preferably NaSH as a solution in water, but it can also be liquid or gas. The use of NaSH is preferred because it is less volatile and more controllable in the reaction, which in turn means that less is by-passed in the reactor, which in turn means that less chance exists for noxious emissions, which in turn means a lower demand for neutralizing reagent to scrub it from the reactor off-gases. On the other hand, the use of hydrogen sulfide in gaseous or liquid forms does not contribute sodium ions to the solutions which, as mentioned with regard to the use of sodium bisulfite in the bismuth stage, may impact the environmental acceptability of effluent discharges.

Copper is precipitated as cupric sulfide and recovered by solid/liquid separation techniques for ultimate return to the smelter. When a prime copper smelting facility is on-site, then returning the copper in a concentrated, low volume form is desirable because it smelts with energy release and minimizes the bulk of material that must be dried to reduce moisture content and absorb heat in the smelting process. Some conventional hydrometallurgical processes extract copper by solvent extraction followed by electrowinning. These are cumbersome, energy-consuming techniques that are unnecessary when copper can be returned directly to the smelter.

Another feature of this invention is that the amount of copper that is extracted from the feed solutions to the copper precipitation stage is maximized at a high level (e.g., over 90%). Still another feature is that the quantity of arsenic that can be removed varies between very high and moderate levels in order to control the amount of arsenic returning to the smelting process (and thus, the amount in the anode copper to the refinery). For example, the co-extraction of arsenic with copper can vary between 100 and 33% both at high levels of extraction of copper.

The liquid fraction of the copper precipitation stage can either be forwarded directly to a final precipitation/neutralization state or, alternatively, to an arsenic/cadmium precipitation stage. As mentioned, arsenic removal from the circuit must be moderated. For efficient anode production, a 3:1 ratio of antimony and bismuth to arsenic provides for good rejection of the antimony and bismuth to anode slimes but beyond this, it is also valuable to have additional arsenic present to dissolve from the anodes and build the arsenic concentration in the copper electrolyte to a level above 6 grams/liter (g/l) and preferably above 9 g/l. This also encourages the bismuth and antimony to deport to anode slimes rather than solubilize in the copper electrolyte where it can contaminate the cathode copper. Thus arsenic is similar to lead in that it is a necessary contaminant up to a certain point, but unlike lead, excess arsenic can be present in the circuit without harm to the overall pyrometallurgy of copper.

Fixing arsenic as ferric arsenate in a gypsum precipitate, and its disposal into a tailings dam or other landfill, is known. This disposal can be environmentally acceptable if one or the other is available. However, universal agreement is absent on the environmental acceptability of ferric arsenate, and many smelters do not have large disposal facilities. As such, they need to reject the arsenic from the circuit in a concentrated form, e.g., as a sulfide precipitate of low volume and high arsenic concentration, that can be disposed to a hazardous materials facility.

While arsenic can be effectively removed as a sulfide from acid solution at levels of free acid as high as 200 g/l, the removal of zinc and cadmium is acid sensitive. Zinc is the most difficult to sulfide precipitate at high acid levels, but it can be allowed to pass through into the final neutralization stage since it is not an environmentally sensitive metal. Cadmium is more readily precipitated than zinc, and it can be eliminated with arsenic as the sulfide. After doing so, very low levels of arsenic and cadmium are left in solution, and these can be combined with the solid fraction from the bismuth precipitation stage and passed to the final precipitation/neutralization stage.

Antimony is partially extracted in the sulfide precipitation stage, and approximately 50% of the input material is collected with the copper/arsenic precipitate (both as a result of unleached antimony in the acid leach residue, and partial sulfide extraction). The remainder is rejected with the arsenic/cadmium precipitate and with the final tailings. Thus, a moderate to good rejection of antimony is achieved which could be improved if the acid leach residue were extracted from the circuit and separately processed. In many cases the smelting process has a good ability to reject antimony in slag and when combined with the high tolerance for antimony in cathode copper, as compared with bismuth, the emphasis is often on bismuth extraction.

Again, as with the bismuth precipitation stage, in the final precipitation/neutralization stage, the choice is between a neutralizing agent that produces a high volume solid precipitate, and one that produces a high soluble sulfate liquid effluent. In one embodiment, the neutralizing agent is limestone slurry in a preliminary stage followed by milk of lime in a final stage. This produces a gypsum precipitate that passes present solid waste discharge regulations, and it can be safely disposed to a landfill or a tailings dam. The liquid effluent is minimized as previously described to meet mass discharge regulations.

In another embodiment, the neutralizing agent can be a sodium or magnesium compound that produces a small volume of final precipitate consisting mainly of the hydroxides of zinc, cadmium, iron, molybdenum and the like. The smaller quantity of this precipitate, as compared with gypsum precipitate, does not preclude it passing the relevant solid waste regulations, especially when the sulfide precipitation stages are tuned to maximize the extraction of arsenic and cadium. In cases where these metals have an economic value, e.g. zinc, cadium and molybdenum, they can be beneficially removed by controlling the acidity of the sulfide precipitation stages to maximize the passage of materials other than those of copper and arsenic to final neutralization. Beneficial extraction of the metals can then be effected by known technology such as sequential precipitations as hydroxides. The flexibility in the sulfide precipitation stages to control extractions is previously described.

The process of this invention provides an inherently safer and more hygienically acceptable treatment of impurities from the pyrometallurgy of copper than existing alternatives. The use of a water leach stage at the front end of the circuit allows handling of electrostatic precipitator dust as a pulp, and this can be done at a dust extraction device, e.g., an electrostatic precipitator (ESP) or a bag house, rather than handle dry dust. Moreover, the use of the water leach avoids the need to pulp the dust at the dust extraction device with high strength and high temperature acid leach solution, a procedure that could have safety implications. Moreover, it preferentially extracts a large proportion of copper from the system in a safe and easy manner, with the potential to reduce the usage of expensive and high volume sulfide precipitation reagents which can be important where the transport logistics are difficult. Still further, incorporating the water leach allows the downsizing of acid leach since copper throughput is a deciding factor in the sizing of these stages. This downsizing also results in a reduction in the capital and operating costs associated with a hydrometallurgical facility.

The process of this invention also allows for the early separation of bismuth from lead, which in turn allows the recycling of the lead residue (which usually contains a fair amount of precious metal value) to the smelter. In effect, the process of this invention creates another door for removing bismuth from the copper production circuit.

This invention also allows for the processing of all impurity streams associated with a process for the pyrometallurgy of copper. The bleed streams from the copper electrorefining and precious metal refining operations can be fed individually or as a blended stream and depending upon their compositions, can be fed to the acid leach and/or bismuth precipitation stage. The decision as to where to introduce these bleed streams depends upon their particular composition.

The arsenic/cadmium precipitation stage is the last sulfidizing stage of the invention, and it can receive APB directly and thus by-pass the acid leach stage. This imparts desirable flexibility to the hydrometallurgical process because when upstream components to the process are under maintenance, the dust can be recycled temporarily to the smelter, and the hydrometallurgical plant can still accept APB from the acid plant. This avoids the need of constructing a separate APB processing facility to ensure that the main smelter process can continue operation.

The process is designed to recycle as much liquid to the upstream stages as possible to reduce the final effluent and the need for make-up water. This is done by returning filtrates from the solid/liquid separation stages to the acid leach and by utilizing final sulfide precipitation liquids as the repulping solution when bismuth precipitate is rejected with the final neutralization precipitate.

While this invention has been described in specific detail by reference to the Figure, this detail is provided for purpose of illustration only and is not to be construed as a limitation upon the invention as described in the following claim.

What is claimed is:

1. A hydrometallurgical process for the recovery of primary metal values and the capture and conversion of metal impurities to states that are acceptable for disposal to the environment, the primary metal values recovered from impurity streams generated during the pyrometallurgy of copper, the process comprising the steps of:

A. Pulping and leaching dust from a smelter source, the dust containing copper, at least one precious metal, bismuth, arsenic, iron and cadmium values, with water in a stage to form a water leach pulp in which at least part of the copper values are solubilized;

B. Separating the water leach pulp into a liquid fraction and a solids fraction;

C. Transferring the solids fraction of (B) to an acid leach stage, and recycling the liquid fraction of (B) to the water leach stage;

D. Pulping and leaching the solids fraction of the water leach stage with acid in the acid leach stage to form an acid leach pulp such that the bismuth values are solubilized;

E. Separating the acid leach pulp into a solids fraction and a liquid fraction;

F. Transferring the liquid fraction of the acid leach stage to a bismuth precipitation stage, and the solids fraction of the acid leach stage to a copper precipitation stage;

G. Precipitating at least part of the bismuth values in the bismuth precipitation stage with a neutralizing agent;

H. Separating the bismuth precipitate from the liquid of the acid leach stage and transferring the precipitate to a final neutralization/precipitation stage, and transferring the remaining liquid fraction to the copper precipitation stage;

I. Precipitating at least part of the copper values from the liquid fraction of (H) in the copper precipitation stage;

J. Separating the precipitate of (I) from the remaining liquid fraction of (H) and transferring the precipitate to the smelter source, and transferring the remaining liquid fraction to an arsenic/cadmium precipitation stage;

K. Precipitating at least part of the arsenic and cadmium values with a sulfiding agent in the arsenic/cadmium precipitation stage;

L. Separating the arsenic/cadmium precipitate from the remaining liquid fraction of (K) and transferring the precipitate to a disposal site, and recycling the liquid fraction of (K) to the acid leach stage;

M. Neutralizing the solids fraction of the bismuth precipitation stage and precipitating and neutralizing at least part of the iron and other remaining metal values in the liquid fraction of the copper precipitation stage in the final neutralization/precipitation stage; and N. Removing the precipitate of the final neutralization/precipitation stage to a disposal site.

2. The process of claim 1 in which at least a part of the dust that is pulped and leached in the water leach stage is at least one of flue dust, boiler dust and electrostatic precipitator dust.

3. The process of claim 2 in which the dust is pulped at a location remote from the leaching stage.

4. The process of claim 2 in which the liquid fraction produced in the water leach stage is divided into a first stream which is returned to the water leach stage and a second stream which is transferred to the copper precipitation stage.

5. The process of claim 4 in which the first stream has a pH of between about 2 and about 4.

6. The process of claim 2 in which the acid used in the acid leach stage is sulfuric acid.

7. The process of claim 6 in which the solids fraction from the water leach stage is admixed in the acid leach stage with at least one of APB and a refinery bleed.

8. The process of claim 7 in which the acid leach stage is conducted in at least two continuous acid leach reactors such that the acidity of the acid leach pulp is continuously reduced from the first reactor through the last reactor.

9. The process of claim 8 in which the acidity of the acid leach pulp is reduced by at least about 50%.

10. The process of claim 9 in which the temperature is maintained between about 60° and about 100° C.

11. The process of claim 2 in which at least a portion of the solids fraction from the acid leach stage is recycled to a smelter.

12. The process of claim 2 in which the liquid fraction from the acid leach stage is admixed in the bismuth precipitation stage with a refinery bleed containing soluble bismuth.

13. The process of claim 2 in which the neutralizing agent is a limestone slurry.

14. The process of claim 13 in which the bismuth precipitation stage is conducted at a pH of between about 1.5 and about 2.5.

15. The process of claim 13 in which the bismuth precipitation stage is conducted at a pH of between about 2.0 and about 2.5.

16. The process of claim 14 in which a reducing agent is present in the bismuth precipitation stage.

17. The process of claim 16 in which the reducing agent is sulfur dioxide.

18. The process of claim 17 in which the source of the sulfur dioxide is a smelter off-gas.

19. The process of claim 17 in which the source of the sulfur dioxide is selected from the group consisting of sulfites and biosulfites.

20. The process of claim 17 in which the bismuth precipitation stage is conducted at a temperature in excess of ambient, and in which the reducing and the neutralizing agents are admixed with the liquid fraction from the acid leach stage such that the acidity of the liquid fraction is reduced and the loss of reducing agent from the surface of the liquid fraction is minimized.

21. The process of claim 20 in which the amount of reducing agent is sufficient to inhibit arsenic precipitation but is less than the stoichiometric amount required for the reduction of the non-bismuth species present in the liquid fraction from the acid leach stages.

22. The process of claim 2 in which the neutralizing agent in the bismuth precipitation stage is a non-calcium neutralizing compound.

23. The process of claim 2 in which the neutralizing agent in the bismuth precipitation stage is at least one of sodium carbonate, sodium hydroxide and magnesium hydroxide.

24. The process of claim 2 in which the liquid fraction from the bismuth precipitation stage is admixed at the copper precipitation stage with a sulfiding agent.

25. The process of claim 24 in which the amount of sulfiding agent necessary to precipitate the copper is reduced due to the reduction of copper in the bismuth precipitation stage from the presence of at least one of sulfur dioxide, a sulfite or a bisulfite.

26. The process of claim 25 in which the sulfiding agent is sodium hydrogen sulfide.

27. The process of claim 26 in which the liquid fraction from the bismuth precipitation stage is also admixed with APB.

28. The process of claim 2 in which the liquid fraction from the copper precipitation stage is transferred to the final precipitation/neutralization stage.

29. The process of claim 2 in which the dust further comprises antimony values.

30. The process of claim 29 in which the sulfiding agent is sodium hydrogen sulfide.

31. The process of claim 30 in which the antimony values are at least partially extracted in the arsenic/cadmium precipitation stage.

32. The process of claim 2 in which the sulfiding agent in the arsenic/cadmium precipitation stage is a sodium or magnesium compound that produces a precipitate of at least one hydroxide of cadmium.

33. Gypsum produced by the process of claim 1.

* * * * *

UNITED STATES PATENT AND TRADEMARK OFFICE
CERTIFICATE OF CORRECTION

PATENT NO. : 5,443,622
DATED : August 22, 1995
INVENTOR(S) : Gabb, Phillip J., et al It is certified that error appears in the above-indentified patent and that said Letters Patent is hereby corrected as shown below:

Column 14, line 19, after "water in a", insert --water leach--.

Signed and Sealed this

Twelfth Day of December, 1995

Attest:

BRUCE LEHMAN

Attesting Officer

Commissioner of Patents and Trademarks